July 18, 1939.   H. T. LAMBERT   2,166,742
VOLUMETRIC CONTROL MASTER CYLINDER
Filed Feb. 3, 1937   4 Sheets-Sheet 1
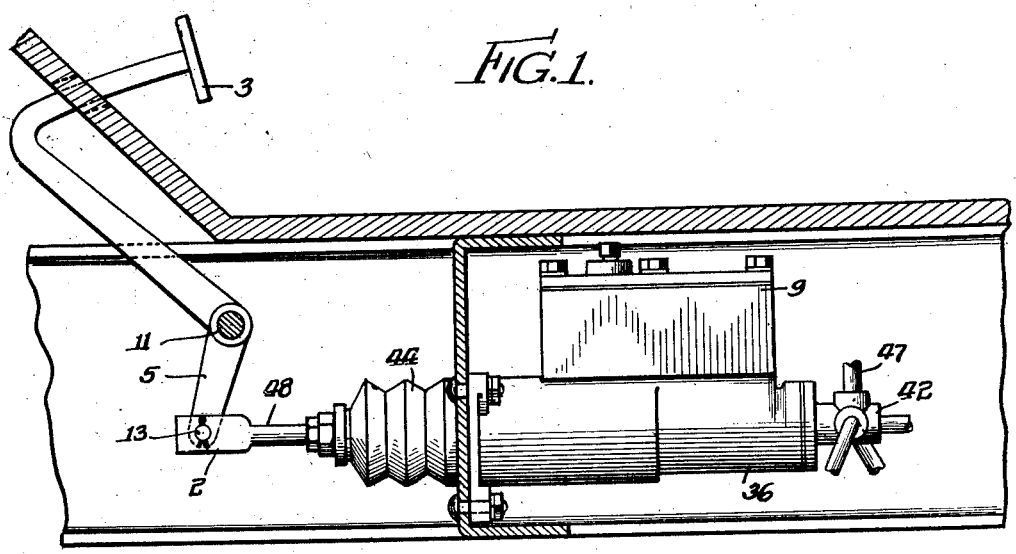
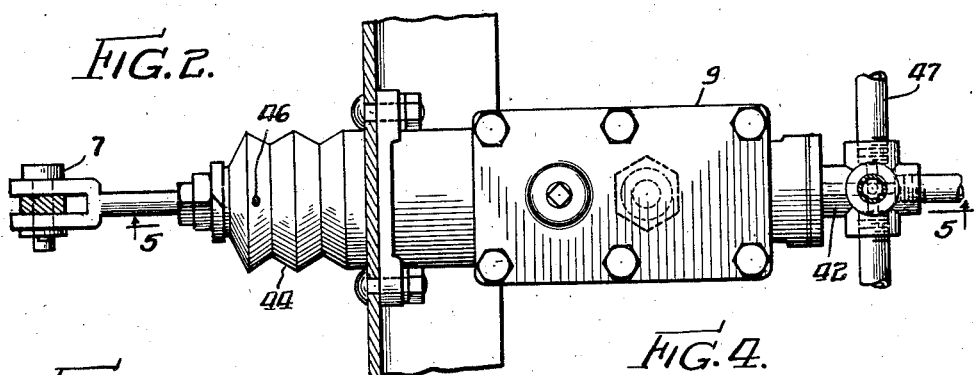
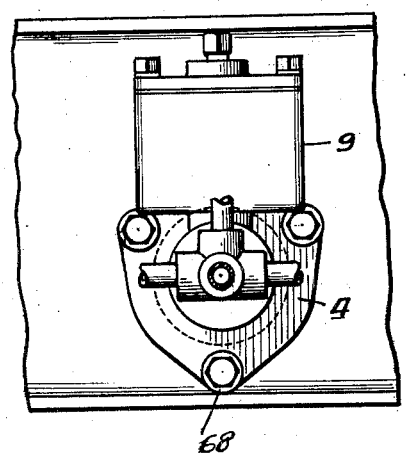
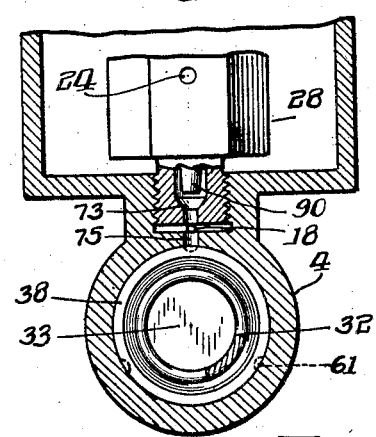
Inventor
Homer T. Lambert
By: Cox & Moore attys.

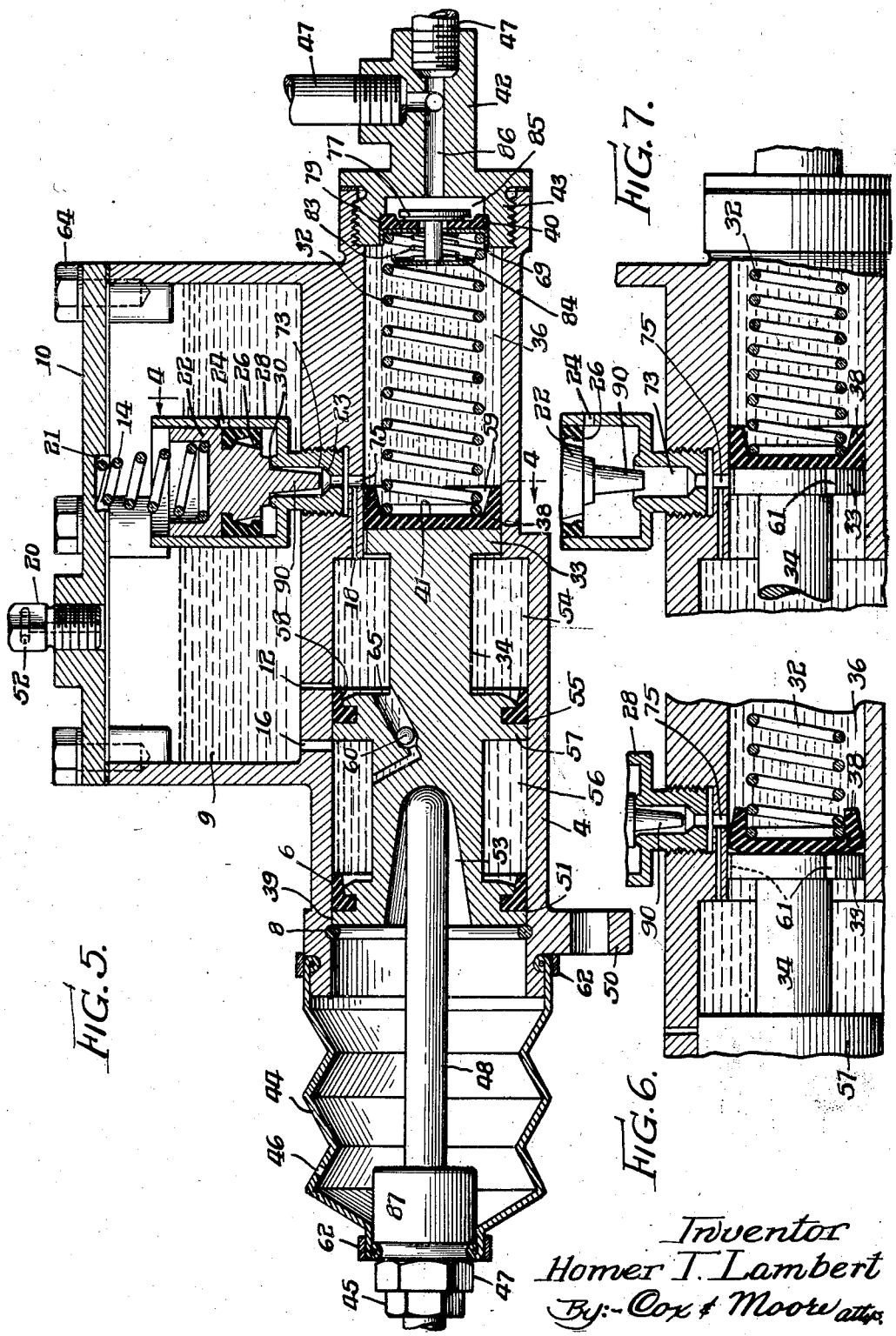

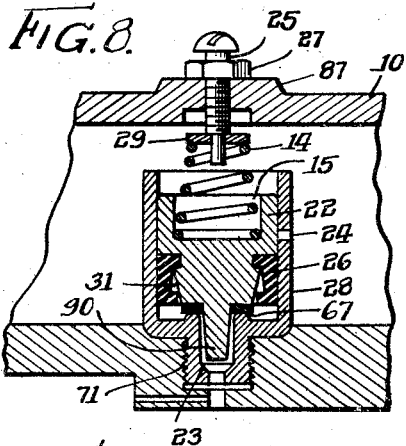
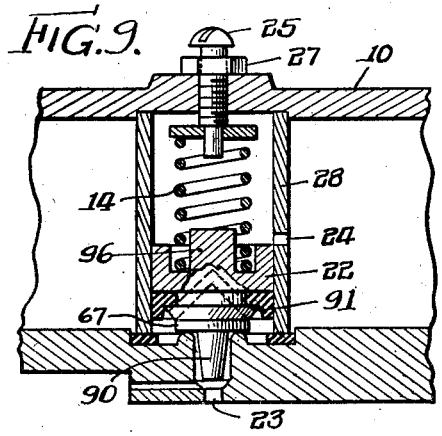
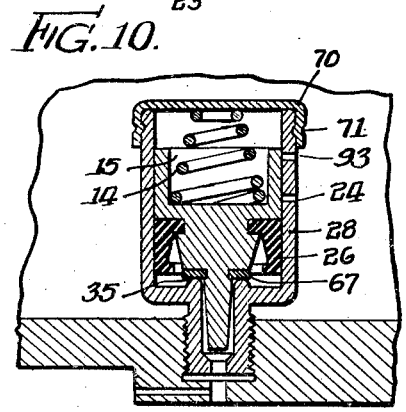
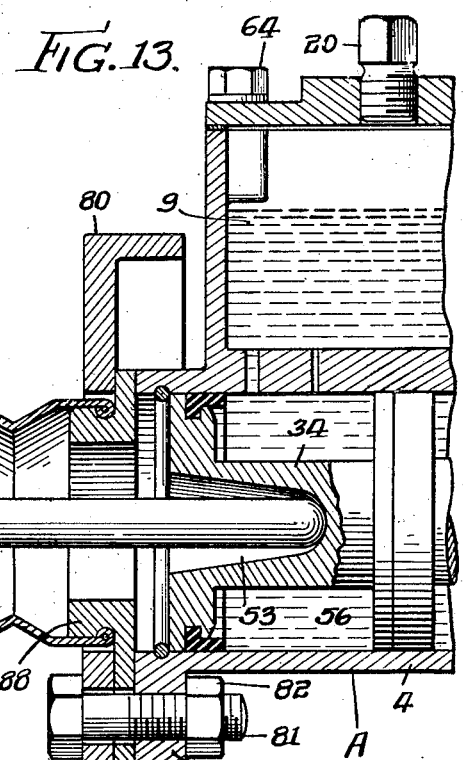
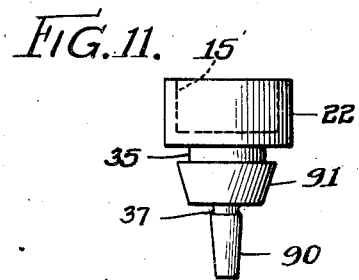
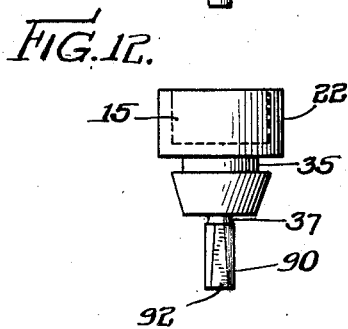
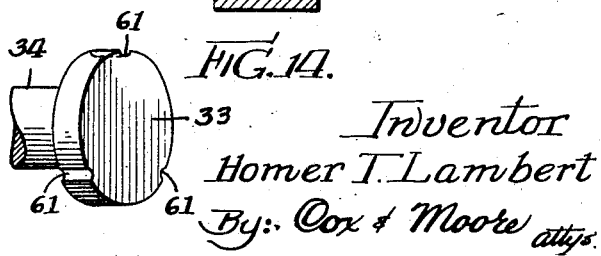

July 18, 1939.   H. T. LAMBERT   2,166,742
VOLUMETRIC CONTROL MASTER CYLINDER
Filed Feb. 3, 1937   4 Sheets-Sheet 4
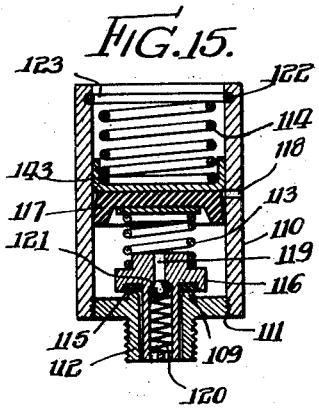
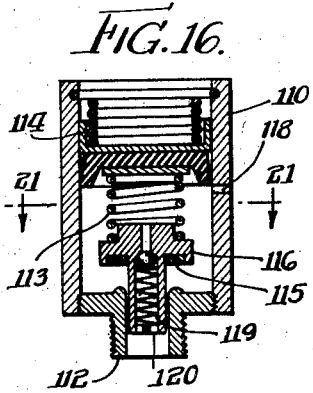
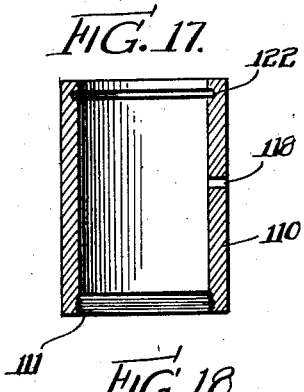
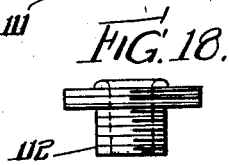
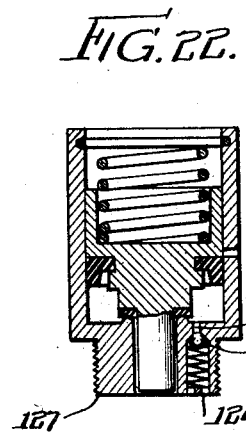
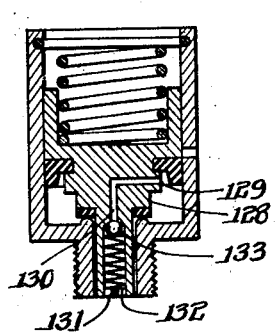
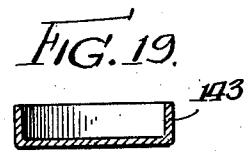
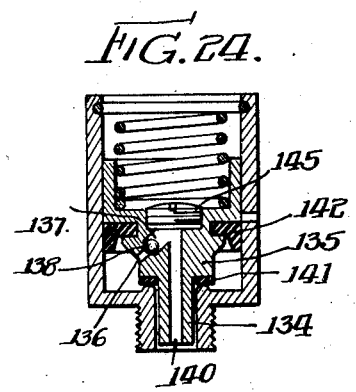
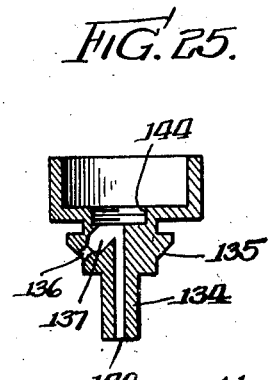
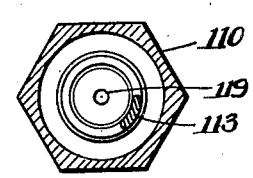
Inventor
Homer T. Lambert
By:- Cox & Moore attys.

Patented July 18, 1939

2,166,742

UNITED STATES PATENT OFFICE 2,166,742

VOLUMETRIC CONTROL MASTER CYLINDER

Homer T. Lambert, St. Joseph, Mich.

Application February 3, 1937, Serial No. 123,893

12 Claims. (Cl. 60—54.6)

This invention relates to a volumetric control for fluid pressure systems. While the invention has been illustrated in connection with its application as a master cylinder for applying brake shoes or clutch devices to a cooperative braking or clutching surface, it is to be understood that the master cylinder is of general application.

Heretofore in hydraulic actuated systems for automotive brakes and the like, the master cylinders that have been used have created a small volume pressure to provide a braking action, through the medium of wheel cylinders to actuate the brake shoes. The pressure created in the hydraulic cylinder is caused by pumping the brake foot pedal and its cooperative plunger and cylinder piston. In many instances it has been necessary to pump the brake pedal one or more times to build up the necessary volume for the braking action required to properly stop the car. This unnecessary pumping of the pedal has been due to the small single stage master cylinder of the present day type, which does not have enough initial volume to instantly cause the brake shoes to travel into engagement with the brake drums. This pumping of the master cylinder or of the pedal is what is commonly known as "loss of pedal", and the loss of time, although it may be slight, usually happens at a critical moment and is instrumental in causing many of the accidents and consequent loss to life and property.

Furthermore, in the present day brake systems, using the conventional master cylinder, the brake shoes have to be set relatively close to the drums because the small volume contained in the master cylinder is not adequate to move the brake shoes into engagement with the drums. This small clearance between the shoe and the drum is usually detrimental because if the brakes get out of adjustment the shoes will have a tendency to drag against the drums.

Also, in the present day braking systems, when the lining of the shoes is worn, due to constant braking action, the brake shoes have to be properly adjusted, and the average mechanic cannot adjust the shoes perfectly concentric with the drums. When the relation of the drums and its shoes is impaired, the wearing surface is necessarily uneven, and by changing the wearing surface the effective braking action is changed because no shoe is ever made perfectly concentric with the drum. This adjustment of the braking shoes will cause an uneven wear of the linings. Any uneven adjustment will cause the lining to wear out in one place more rapidly than in another.

An object of this invention is to provide a fluid pressure apparatus for effecting a balanced pressure and a complete elimination of the loss of pedal stroke.

A further object of the invention is that the adjustment of the brake shoes will be eliminated, since the volume in the master cylinder is sufficient to allow only a consistent travel of the brake pedal, regardless of any clearance due to wear and tear on the lining, the reserve being adequate to function properly and safely at all times.

A further object of the invention is to provide a two-stage master cylinder for holding and controlling the volume of fluid pressure in the cylinder to any degree required by the operator.

A further object of the invention is to provide a fluid pressure apparatus having a spring relief valve for holding and controlling the volume of fluid pressure in the apparatus until the volume reaches a pressure equal to that of the spring pressure in the relief valve, and then automatically relieving this pressure to create a hydrostatic pressure.

A further object of the invention is the combination of a brake pedal, a two-stage master cylinder and a brake system, which upon movement of the pedal develops an initial low pressure in the master cylinder for setting the brake shoes against the brake drums, and simultaneously developing a higher pressure for forcing the brake shoes against the brake drums, said braking action being created without any pumping or diving of the pedal.

The accompanying drawings illustrate a selected embodiment of the invention, and the views therein are as follows:

Fig. 1 is an elevational view, showing the master cylinder unit and connections therefor;

Fig. 2 is a plan view of Fig. 1;

Fig. 3 is an end view of the cylinder unit;

Fig. 4 is a sectional view taken on line 4—4 of Fig. 5;

Fig. 5 is a sectional view taken on line 5—5 of Fig. 2;

Figs. 6 and 7 are views similar to Fig. 5, showing the changed position of the piston;

Fig. 8 is a sectional view of a modified relief valve mechanism;

Fig. 9 is a modified form of the relief valve;

Fig. 10 is another modification of the relief valve, showing a permanent cover therefor;

Fig. 11 is a view of the relief valve piston;

Fig. 12 is a modified form of the relief valve piston;

Fig. 13 is a partial sectional view, showing the mounting of the cylinder to the frame of the automobile;

Fig. 14 is an end view of the cylinder piston;

Fig. 15 is a sectional elevational view of a modified form of relief valve, showing the use of a primary and secondary spring for seating the valve, and also a back pressure relief spring and ball seat;

Fig. 16 is a view similar to Fig. 15, showing the valve in raised position;

Fig. 17 is a sectional elevational view of the casing for the valve shown in Fig. 15, having the internal threads at the bottom thereof;

Fig. 18 is an elevational view of the extension adapted to be threaded into the casing;

Fig. 19 is a sectional elevational view of the spring seat for the valve;

Fig. 20 is a sectional elevational view of the lower part of the valve piston;

Fig. 21 is a view taken on line 21—21 of Fig. 16;

Fig. 22 is a sectional elevational view of another form of relief valve, showing a modified disposition of the back pressure relief spring and ball, and using only one main valve spring;

Fig. 23 is a view similar to Fig. 22, showing the back pressure relief valve disposed in the body of the valve piston;

Fig. 24 is a sectional elevational view of another form of valve, showing a modified disposition of the back pressure relief spring and ball angularly disposed in the body of the valve piston; and Fig. 25 is a sectional elevational view of the valve piston shown in Fig. 24.

The invention comprises a master cylinder unit which will be generally designated as A, clearly shown in section in Fig. 5. The cylinder unit A is clamped to a bracket 80 on the frame of an automobile (not shown) (see Fig. 13). The cylinder has a mounting flange 50 with a recess 51, adapted to receive a bolt 81 and nut 82 for clamping it to the frame 80.

The hydraulic cylinder unit comprises three integral parts—a large cylinder 56, a small cylinder 36 and a reservoir or supply tank 9. At one end of the unit adjacent the large cylinder 56 is a clevis 2 for connecting the cylinder with a foot pedal 3, through the medium of a crank arm 5 which is attached to the clevis 2 by a bolt 7 and cotter pin 13. The foot pedal 3 and the crank arm 5 are journalled in a shaft 11, which is part of the automobile structure. The clevis has a piston plunger 48 extending into the piston 34. This plunger is adjustable and locked by a jam nut 45. This adjustment of the plunger 48 is necessary to synchronize the piston 34 with ports 12 and 75 in the cylinder unit A, to be hereinafter described.

Surrounding the piston plunger 48 is a boot 44. This boot is connected to the enlarged portion 87 of the plunger by means of a clamping spring 62. The boot, at its opposite end is connected to the large cylinder 56 adjacent the mounting flange 50, by means of a second clamping spring 62.

In cases where the hydraulic unit is applied in lieu of the old type of units, the end of the cylinder 56 has an adapter flange 88 (Fig. 13) to receive the boot 44. This adapter flange makes it very easy for mounting the hydraulic unit on any of the present type of cars equipped with hydraulic brakes. When the bolts are removed to dismount the hydraulic cylinder, the adapter flange 88 and the rubber boot are not removed, which makes it very convenient in dismounting the unit. The function of this boot is to keep out dirt and the like from the master cylinder. The boot has an air vent 46 which will prevent the boot from acting as a bellows.

The large cylinder 56 has a triple piston member 34 which cooperates with the plunger 48 to provide a transfer of fluid pressure in the cylinder. At the rear end of the piston 34 is a flange portion 39 of an increased diameter, which is flush with the inside of the cylinder wall 4. Intermediate the flange 39 and extending into the piston 34 is a tapered recess 53, adapted to receive the piston plunger 48 for cooperating with the plunger and brake pedal 3 to actuate the piston. The cylinder 56, at the end adjacent the flange 39, has a snap ring 8 mounted in grooves of the cylinder body 4. This snap ring 8 serves to act as a piston stop on the backward stroke of the piston 34. The piston flange 39, on its outer periphery, has a recess 51 adapted to receive a rubber piston seal ring 6 for the overflow of large cylinder 56. The ring 6 is adapted to seal the overflow of fluid flowing through the ports 12 and 16 from the reservoir into the cylinder 56 as the piston is moved forward. The rubber ring 6 is never under pressure, and also acts as a seal to prevent any air from entering the cylinder 56, which would interfere with the operation of the fluid as a solid.

Intermediate the longitudinal axis of the piston 34 is a second enlarged piston flange 57, similar to and substantially the same in dimensions as the rear flange 39. This flange 57 has a recess 55 adapted to receive a rubber piston seal 58 for the low pressure cylinder 54. This rubber ring functions to seal the cylinder 54 as the piston is moving forward to set the brake shoes, hereinafter described. The flange 57 has an angular recess 65 which has a ball check 69 comprising a release valve. The purpose of this valve is for sealing the fluid to prevent its escape into the overflow cylinder 56 upon the forward stroke of the piston 34. Upon the backward stroke this valve releases the fluid from the cylinder 56 into the cylinder 54 to permit the piston to return to its normal position against the locking ring 8. When the piston is in its normal position, as shown in Fig. 5, adjacent each vertical side of the flange 57 are ports 12 and 16, extending through the cylinder casing 4 to connect the cylinder with the reservoir 9. The port 12 is a supply port for the low pressure cylinder 54, while the port 16 is a supply port for the overflow cylinder 56. This port 16 allows fluid to flow in and out from the reservoir 9, and also prevents air from entering the cylinder. The port 12 supplies the low pressure cylinder 54 with fluid at the finish of the back stroke of the piston and also acts as a release port.

The piston 34 is provided at its opposite end with a smaller piston flange 33 movable in the small high pressure cylinder 36, immediately adjacent and integral with the cylinder 54. The flange 33 has a plurality of apertures 61 (see Figs. 4 and 14) circumferentially disposed to allow the fluid to flow therethrough from the cylinder 54 into the cylinder 36. Adjacent the flange 33 and contained within the cylinder 36 is a high pressure rubber piston seal 38. It is to be noted that in the construction of the master cylinder there is provided a two-stage cylinder having a large and small cylinder compounding a pressure on one power stroke in the cylinder with an automatic interconnection. The rubber seal 38 has a tapered recess 41 for anchoring one end of a piston return spring 32. The spring 32 extends through the cylinder 36 and is anchored at its opposite end between the recess 69 and the flange member 84 of the pressure control check valve 40. The pressure control check valve is of the conventional type and is mounted in the threaded member 43, threaded in the body 4 at the end of the high pressure cylinder 36.

The movement of the piston on the pressure stroke forces the fluid into the cylinder 36 and into contact with the flange 84 to release the valve 77 against the action of the small spring 83. The release of the valve allows the fluid to communicate with the wheel cylinders of the braking system. The compression spring 32, upon release of the brake pedal, expands to return the piston. The return of the piston by the spring 32 reduces the line and cylinder pressures, and due to the fitting of the end coils of the spring 32 between the flange 84 and the recess 69 of the check valve, this spring, upon expansion, also closes the valve 40. The valve spring 83, upon the reduction of the pressure, expands to cooperate with the spring 32 and assist the closing of the valve 40. The reduction of pressure is such that there will be a sufficient low pressure in the system to prevent any leaking of the various rubber seals. The rubber seals, under a sufficient pressure, would leak due to the lip construction of the seals. The return spring 32 serves the purpose of returning the piston, releasing the entire pressure from the lines and wheel cylinders, and closing the valve 40.

On top of the cylinders 36 and 54, and extending integrally therewith, is a supply or reservoir tank 9, containing a fluid or the like. The cylinders 36 and 54 are baffled from the tank by the casing 4. The reservoir tank has contained therein a spring relief valve having a casing 28 with a lower extension 71, adapted to be threaded into the casing 4 between the reservoir 9 and the cylinder 36. This extension 71 has an aperture 73 which cooperates with an aperture 75 in the baffle casing 4. These apertures act as ports for the fluid when the pressure of the valve is released, to be hereinafter explained. In the baffle 4, and extending longitudinally with the cylinder 36, but inwardly disposed therefrom, is a port 18 which is connected to the port 75 and the cylinder 54. This port acts as a supply port for the fluid from the low pressure cylinder 54 in setting the shoes against the drum. It has the further function of acting as a release port upon the backward stroke of the piston. The casing 28 is vertically disposed in the reservoir 9, and has contained therein a relief valve mechanism. This valve mechanism consists of a valve piston plunger 22 (see Figs. 11 and 12), having an intermediate tapered portion 91 and a tapered extended portion 90 of a decreased diameter (see Fig. 11). The member 90 extends into a recess 23 in the extension portion of the casing 28. The recess 23 (see Figs. 5 and 8) is connected to and in vertical alignment with the ports 73 and 75. The top portion of the valve piston 22 has a recess 15 which receives a valve relief spring 14. The spring 14 is anchored in a recess 21 of the casing or cover plate 10 of the supply tank 9 to create a degree of valve pressure which must be relieved to automatically operate the master cylinder in an efficient manner. The plunger 22 has a groove 35 intermediate the tapered portion 91 and spring seat 15. This groove 35 is adapted to receive a rubber seal 26 surrounding the tapered portion 91.

Below the rubber seal 26, and contained within the casing 28, is a metal-to-metal valve seat 30. This seat 30 has the function of seating the valve and also the fluid in the volume cylinder 54 until sufficient pressure is created to set the brake shoes against the brake drums. The seating of this valve is controlled by the spring 14, which has a predetermined spring pressure.

The reservoir 9 has a casing or tank cover 10 bolted to the reservoir by means of bolts 64. Fluid or the like is supplied to the reservoir 9 by means of a threaded plug 20 which has an air vent 52. The purpose of this air vent is to regulate the flow of fluid under prevailing atmospheric conditions.

Considering Figure 5, and starting with the parts as therein shown, with fluid at no appreciable pressure in cylinders 56, 54 and 36, the operation is such that when the operator presses his foot upon the pedal 3 the plunger 48 will be actuated on the pressure stroke to begin movement of the triple piston 34.

Upon preliminary movement of the triple piston, the pistons 39 and 57 will move the liquid contained therein to build up a relatively large pressure in the cylinder 54 which, in turn, will force the liquid therefrom through the aperture 18 and connecting port 75 into the cylinder 36, and in addition, will force liquid through the small ports 61 which are disposed circumferentially on the outer periphery of the piston 33, over and around the sealing ring 38 into the cylinder 36. The initial travel of this triple piston 34 has the purpose of quickly bringing the brake shoes up to the braking surface with minimum travel and minimum effort. In this condition, the tank or reservoir 9 will be substantially full of liquid.

Fig. 6 shows the condition of the sealing ring 38 during the primary movement of the triple piston. The flexible skirt of the sealing ring 38 is in a substantially collapsed position so as to permit a free transfer of the fluid passing through the ports 61 into the cylinder 36. With the influx of this additional liquid into the cylinder 36, liquid is forced past the pressure-control check valve 40, through the conduit 86, and thence through pipes 47 to the individual brake cylinders, to position the movable elements of the brake shoes against their respective braking surfaces.

As the pressure builds up in the cylinder 54, due to the displacement of the volume by continued movement of the triple piston 34 on the pressure stroke, this increased pressure in the cylinder 54 causes operation of the pressure relief valve 22 to relieve the pressure in the cylinder 54. This is accomplished by a transfer of the fluid through conduit 18, communicating with the port 75 into the entry port 73 of the relief valve. This relief valve 22 is normally pressed downwardly by means of a spring 14, whereby to close the exhaust port 24 thereof. When the pressure in the cylinder 54 exceeds the predetermined set pressure of the spring 14, the valve 22 will be forced upwardly to a position such that the liquid will exhaust outwardly through the port 24 into the tank or reservoir 9 and relieve the pressure in the cylinder 54. Upon the relieving of the pressure in the cylinder 54, but before this relief has reached its maximum, the flow of the fluid over and around the sealing ring 38 is stopped. This is due to the relief of pressure. Simultaneously with the stopping of the transfer of fluid over and around the ring 38, the sealing ring automatically spreads out peripherally, to assume the position shown in Fig. 7, and thus seal and prevent any further liquid flowing into the cylinder 36 from the cylinder 54. Upon continued movement of the triple piston, the sealing ring 38 seals the cylinder 36 from the ports 75 and 61, thereby confining the fluid in the cylinder 36, and thus displacing this fluid to create a higher pressure in the cylinder 36, which will exert a braking force between the shoes and the drums of much higher pressure than the cylinder 54 would provide. This higher pressure, developed in the cylinder 36, involves the principle of hydraulics, caused by the dimensional difference of cylinder 36 as compared to cylinder 54.

In fact, in the illustration herein disclosed, for example, but not by way of limitation, it might take thirty pounds of pressure created in the cylinder 54 to move the shoes against the drums. Then, when this pressure approaches, say, thirty-five pounds, the relief valve operates to relieve the pressure in this cylinder 54, then automatically the sealing ring 38 will expand to the position shown in Fig. 7 and will seal the smaller cylinder 36, in which cylinder the pressure may run upward to approximately six hundred pounds, more or less, and is utilized for actual power to apply the brakes.

The pressure relief valve is constructed and arranged so that as the pressure builds up in the cylinder 54, as hereinbefore described, upon operation of the valve it releases the exact amount of fluid through the exhaust 24 to prevent any increase of pressure in the cylinder 54, thus obviating the necessity for application of any increased brake actuating force to the piston plunger and permitting the foot force to act more particularly upon the small piston area whereby a higher braking pressure is obtained; that is to say, the purpose of the relief valve is to release the pressure more or less gradually since it will be obvious that, if this pressure were released suddenly, there would be a tendency for the foot pedal to "dive" at this point. In other words, between the time of the release of the pressure in the large cylinder and the creation of a suitable high brake applying pressure in the smaller cylinder, a definite movement of the brake pedal would be required and it is the general purpose of the present valve to prevent such instantaneous action. Control of the pressure release may be effected in part by the size of the exhaust port 24 with respect to the piston plunger 22. Furthermore attention is specifically directed to the fact that the bottom of the plunger 22 is provided with a tapered pin 90 extending into the surrounding passage 73. Since the pin extends into the passage 73 at all times during its operation, it tends to throttle flow of fluid therethrough but, since the pin is tapered in a direction away from the valve, upward movement of the valve naturally permits gradually increased fluid volume flow. In other words, an increased flow of fluid is permitted to escape from the large chamber as the parts of the valve gradually move to position to uncover the port 24.

It is to be understood that the term "relieving the pressure", as used in the present specification, is intended to cover the situation wherein the pressure is relieved by restricting the pressure to a predetermined maximum or other equivalent situations where the pressure in the designated member is either lessened or hindered in its normal increase, the object of the pressure release being to prevent the normal increase of pressure in the large cylinder to permit the development of a higher pressure in the smaller cylinder without the necessity for applying an excessive foot pressure.

Upon the release of the brake by the operator releasing the pedal, the triple piston 34 is returned to its normal position against the stop ring 8 by the action of the compression spring 32, which also operates the check valve 40. During this return movement the fluid pressure within the cylinder 36 is lessened and released as the triple piston moves backwardly, this release of the fluid being through valve 40, ports 75, 18 and 12, to withdraw the fluid from the brake cylinders and permit the release of the brakes. Simultaneously, the pistons 57 and 39 will be moving backward to draw liquid from the reservoir 9 through ports 16 into cylinder 56. As the triple piston 34 continues its backward movement and as it approaches ring 8, the cylinder 54 will draw fluid through the check valve 60 from the cylinder 56, which has heretofore been filled from the tank 9 through port 16. The purpose of having the cylinder 56 filled with liquid is to provide a liquid seal for the sealing ring 55 to prevent air having access to the large cylinder 54 or the small cylinder 36.

In Figs. 8, 9 and 10 there are shown modified forms of relief valves. Fig. 8 shows a relief valve of substantially the same type disclosed in the preferred embodiment. In lieu of the metal-to-metal valve seat 30 there is a rubber washer seal 67 which is placed in the groove 37 of the piston 22. This washer is for the purpose of seating the valve under pressure spring 14 to resist the pressure up to a certain degree, then releasing the fluid into the reservoir by raising the piston to the port 24. This modification shows the pressure spring attached to an adjusting bolt 25, held in place by an auxiliary nut 27. The bolt 25 is centered through a boss 87 on the casing or cover plate 10, and has at its end a reduced portion adapted to receive a washer 29 which cooperates with the valve spring. This adjusting feature is important in that the operator, at his convenience, may make a soft, medium or hard foot pedal, depending upon the length of travel or the pedal, by merely advancing or retarding the bolt as he may desire. Advancing the bolt creates an increased pressure on the spring 14 to seat the rubber washer or seal 67 tighter, which necessitates a greater fluid pressure to raise the valve at its seat 30. To lower the foot pedal pressure, the bolt 25 merely has to be moved in a retrograde direction to whatever movement the operator may desire.

Fig. 9 shows a further modification having the valve casing 28 extending into the reservoir casing 10. It shows, further, a modified form of anchoring the pressure spring 14 around a vertical extension 96 in the recess 15, which provides a shorter piston and seal. Fig. 10 shows a view similar to Fig. 8, but is modified to provide a self-contained relief valve having a permanent cap member 70 crimped in the circumferential groove 71 in the casing 28 to secure the cap member to the casing 28. This modification also has an additional air vent 93 which assists in allowing the piston to raise to the maximum limit necessary.

In Fig. 12 the valve piston is shown with an extended valve pin 90 substantially cylindrical, in lieu of the tapered pin, as shown in Fig. 11. This substantially cylindrical pin has flat side portions 92 which have the same function of permitting a greater flow to escape as the valve is released.

In Figs. 15 to 21, inclusive, the relief valve is shown with a casing comprised of two members. The upper part of the casing 110 has internal threads 111 at the lower end adapted to receive the threaded extension 112 therein. This modified valve uses two springs 113 and 114 for seating the rubber washer 115 against the seat 109. The primary spring 113 is anchored between the valve piston 116 and the seal 117, and provides a gradual or smooth release of the valve. This spring is weaker and has less tension than the secondary or large spring 114, anchored above the seal 117.

It will be obvious that upon release of the washer 115, the tension of the spring 113 will be first overcome by the pressure from the cylinder 54 to allow the fluid to act against the rubber seal 117, and subsequently raise the seal past the port 118 against the action of the spring 114. The valve piston 116 has a centrally disposed aperture 119 extending vertically therethrough. This aperture 119 is enlarged intermediate the piston to receive a back pressure relief spring 120 and ball 121. The purpose of the back pressure relief spring and ball is that upon release of the brake pedal stroke and the pressure created thereby, the ball releases any back fluid pressure formed between the rubber washer 115 and the rubber seal 117, which will permit an easy seating of the rubber washer 115 by the springs 113 and 114 against the seat 109, and thus hold the fluid in the cylinder 54 under the pressure of the valve springs for another stroke of the brake pedal.

The upper casing 110 is grooved at 122 to receive a snap ring 123, serving to act as a stop for the spring 114. The spring 114 is anchored at its other end in the spring seat 143.

In Fig. 16 the modified valve is shown in its upward position to allow release of the fluid through the port 118.

In Fig. 22 the back pressure relief spring 124 and ball 125 are shown disposed in an aperture 126 of the extension 127 of the valve. The aperture 126 has an enlarged portion for receiving the ball and spring, similar to that shown in Fig. 15.

In Fig. 23 the valve piston 128 has a horizontal aperture 129, interconnected with a vertical aperture 130, which is increased in diameter to form a central aperture 131 for receiving the back pressure relief spring 132 and ball 133, for the purpose as hereinbefore described.

In Fig. 24 the valve piston 134 has a tapered periphery 135, having an inclined circular aperture 136 disposed therein. The aperture 136 is increased in diameter to provide an inclined aperture 137 for receiving a ball 138. The aperture 137 interconnects with a vertical aperture 140, centrally disposed in the valve piston 134 to allow the pressure to be released between the valve seat 141 and the seal 142, as hereinbefore explained. At the top of the piston 134 is a centrally threaded aperture 144 adapted to receive a threaded plug 145. This plug directs the fluid downwardly through the aperture 140, and can be unthreaded for the removal of the ball 138.

The master cylinder, herein described, provides a new and improved means for actuating a brake system by an effective and balanced pressure which eliminates the unnecessary stroking or pumping of the foot pedal. Furthermore, the device initially develops a sufficient quantity of fluid in the wheel cylinders to set the brake shoes against the drum, while allowing for maximum clearance between the shoe and the drum to prevent any possibility of dragging, which otherwise might occur. Also, any adjustment of the brake shoes will be eliminated, since the volume is sufficient to give a consistent pedal travel which will be approximately the same to operate the shoes, whether there is a new or substantially worn out brake lining.

The word "cylinder" as used in the present specification is employed in its broadest sense, not specifically referring to the geometrical designation of the word but to any type of a vessel adapted for decreasing pressure in cooperation with a reciprocal plunger or the like regardless of its transverse sectional shape.

Changes may be made in the form, construction and arrangement of the parts without departing from the spirit of the invention or sacrificing any of its advantages, and the right is hereby reserved to make all such changes as fairly fall within the scope of the following claims:

Having thus described my invention, what I claim as new and desire to secure by Letters Patent of the United States is as follows:

1. In a fluid pressure apparatus comprising a cylinder having a large and a small chamber and means movable in said cylinder to develop an initial pressure, a relief valve connected to said large chamber for relieving the initial pressure, said valve comprising a valve port, a movable valve member adapted to close said port, and resilient means adapted to direct said member to port closing position, said valve member having an elongated extension extending through said port and beyond said valve member, said extension being tapered whereby to varyingly throttle the flow through the valve as the valve member moves to open position.

2. In a fluid pressure apparatus comprising a two-stage compression means comprising a low pressure chamber and a high pressure chamber, means movable in said chambers to develop fluid pressure therein, a relief valve operatively connected with one of said chambers to relieve the pressure therein at a predetermined point, said valve comprising a valve port, a movable valve member adapted to close said port, and resilient means adapted to direct said member to port closing position, said valve member having an elongated extension extending through said port and beyond said valve member, said extension being tapered in a direction away from the valve member whereby to varyingly throttle the flow through the valve as the valve member moves to open position.

3. In a fluid pressure apparatus comprising a cylinder having a large chamber and a smaller chamber, means movable in said chambers to develop an initial pressure, a relief valve connected to said large chamber for relieving the initial pressure, said relief valve having upper and lower interconnected members, said lower member being adapted to cooperate with the valve seat for maintaining the valve in closed or open position, a plurality of springs in said valve adapted to seat the said lower member, said upper member comprising a rubber seal adapted to move past a relief port on the valve for relieving the pressure as the valve moves to open position, and means carried by the lower member to provide back pressure relief between the valve and the seal.

4. In a fluid pressure apparatus comprising a cylinder having a large chamber and a smaller chamber, means movable in said chambers to develop an initial pressure, a relief valve connected to said large chamber for relieving the initial pressure, a spring in said valve anchored between a valve piston and a rubber seal, said rubber seal being movable past a relief port, said valve piston cooperating with a valve port for opening and closing said port and being adapted to be seated adjacent said valve port by said spring, and additional means carried by the piston for relieving the pressure between the seal and the valve, said last named means comprising a back pressure relief spring and ball.

5. In a fluid pressure apparatus comprising a cylinder having a large chamber and a smaller chamber, means movable in said chambers to develop an initial pressure, a relief valve connected to the large chamber for relieving the initial pressure, said relief valve comprising a valve cylinder, a piston in the valve cylinder, a valve seat, and means operatively associated with the piston to close the valve seat, said piston being adapted to move past a relief port in the valve cylinder for relieving the pressure therein.

6. In a fluid pressure apparatus comprising a cylinder having a large chamber and a small chamber, means movable in said cylinder to develop an initial pressure, a relief valve connected to said large chamber for relieving the initial pressure, said relief valve comprising a valve seat, and a piston having an extension adapted to co-act with the valve seat to prevent egress of the initial pressure fluid, said extension being exposed to the said initial pressure, the remainder of said piston being situated interiorly of the valve and normally sealed from said initial pressure when the extension is seated, said piston being adapted to move past a relief port for relieving the pressure in the cylinder.

7. In a fluid pressure apparatus comprising a cylinder having a large chamber and a small chamber, means movable in said chambers to develop an initial pressure, a relief valve connected to said large chamber comprising a piston movable in a valve cylinder, a sealing member operatively connected with said piston and engaging a valve seat in communication with said initial pressure zone, the area of said sealing member adjacent said initial pressure zone being substantially less than the area of the piston, and resilient means urging the sealing member against the seat and said piston being adapted to move past a relief port on the said valve cylinder for relieving the pressure in the valve cylinder when the sealing member is opened.

8. In a fluid pressure apparatus comprising a cylinder having a large chamber and a small chamber, means movable in said chambers to develop an initial pressure, a relief valve connected to said large chamber comprising a piston movable in a valve cylinder, a sealing member operatively connected with said piston and engaging a valve seat in communication with said initial pressure zone, the area of said sealing member adjacent said initial pressure zone being substantially less than the area of the piston, a port operatively associated with said valve cylinder, and means normally urging the piston in a position to cover the port, and the sealing member to closed position with respect to the valve seat.

9. In a fluid pressure apparatus comprising a cylinder having a large chamber and a small chamber, means movable in said chambers to develop an initial pressure, a relief valve connected to said large chamber comprising a piston movable in a cylinder, a valve sealing member operatively connected with said piston and engaging a valve seat in communication with said initial pressure zone, the area of said sealing member adjacent said initial pressure zone being substantially less than the area of the piston, a port operatively associated with said valve cylinder for relieving pressure therein, and a plurality of springs normally urging the piston in a position to cover the port, and the sealing member to closed position with respect to the valve seat.

10. In a fluid pressure apparatus comprising a cylinder having a large chamber and a small chamber, means movable in said chambers to develop an initial pressure, a relief valve connected to said large chamber comprising a piston movable in a valve cylinder, a sealing member operatively connected with said piston and engaging a valve seat in communication with said initial pressure zone, the area of said sealing member adjacent said initial pressure zone being substantially less than the area of the piston, a port operatively associated with said valve cylinder for relieving pressure therein, a spring normally urging the piston in a position to cover the port, and the sealing member to closed position with respect to the valve seat, and adjustable means supporting the spring at one end and adapted to adjustably tension the spring.

11. In a fluid pressure apparatus comprising a cylinder having a large chamber and a small chamber, means movable in said chambers to develop an initial pressure in one of said chambers, a relief valve comprising a valve chamber, said valve chamber having an inlet portion connected to said initial pressure zone, a piston member slidably arranged in said valve chamber, a port in the wall of the said valve chamber, resilient means normally urging the piston in a position intermediate of the port and the inlet portion, and a sealing member operatively associated with said piston and normally sealing the inlet portion, the area of the sealing member in communication with the initial pressure zone being relatively small in respect to the area of the piston, said sealing means being adapted to be actuated toward open position by a predetermined initial pressure and being further adapted to throttle fluid initially passing therethrough.

12. In a fluid pressure apparatus comprising a cylinder having a large chamber and a small chamber, means movable in said chambers to develop initial pressure, a relief valve for relieving said initial pressure, said relief valve comprising an inlet port connected with said large chamber and a valve member adapted to be seated with respect to said port for opening and closing said port, said valve comprising also a relief port for discharging fluid admitted through said inlet port, resilient means movable past said relief port, and means for relieving fluid under pressure in the space between the inlet port and the relief port when the pressure in said large chamber reaches a relatively lower value.

HOMER T. LAMBERT.